United States Patent Office 3,551,233
Patented Dec. 29, 1970

3,551,233
METHOD OF BONDING TWO PORCELAIN COATED OBJECTS
Donald H. Kohnken, Timonium, Md., assignor to SCM Corporation, New York, N.Y., a corporation of New York
No Drawing. Continuation-in-part of application Ser. No. 564,760, July 13, 1966. This application Dec. 7, 1967, Ser. No. 688,682
Int. Cl. C04b 33/34
U.S. Cl. 156—89          3 Claims

ABSTRACT OF THE DISCLOSURE

Porcelain coated metal objects, particularly porcelain coated iron or steel objects, can be joined or sealed together with improved results by adhesive sealing involving an extraneous bonding agent placed between the porcelain coated objects at the areas to be joined or united provided the porcelain coatings at said areas have a reduced thickness as compared with the thickness of the porcelain coatings at other areas. Specifically, porcelain coated objects are joined or sealed together with improved results if the porcelain coating at the location where the porcelain coated objects are to be sealed or joined together has a thickness of about 1 mil and less, such as a thickness in the range from about 0.25 mil to about 1.5 mils. This joining of porcelain coated objects has been found to yield improved results since adhesive bonding agents are available which have tensile strength greater than the porcelain itself employed as the coating and due to the fact that the porcelain immediately adjacent the metal-porcelain interface exhibits greater strength than the porcelain in the porcelain coating relatively remote from the metal-porcelain interface.

---

This application is a continuation-in-part of my copending, coassigned patent application Ser. No. 564,760, filed July 13, 1966 entitled "Improvements in Ceramic Coil Coating Process."

Porcelain coated objects are well known. Methods and techniques for joining porcelain coated objects have for the most part not been completely satisfactory. Some techniques involve the use of mechanical elements, such as clamps, bolts and rivets, to hold together the porcelain coated objects in the desired position. Other techniques involve the complete removal of the porcelain coating from the areas where the porcelain objects are to be joined and then joining these areas together by welding. For the most part the techniques known heretofore for joining or uniting porcelain coated objects have involved operations wherein the porcelain coating in the areas where the objects are joined or united is weakened or removed completely.

It is an object of this invention to provide a porcelain-to-porcelain seal particularly useful for joining or uniting two or more porcelain coated objects.

Another object of this invention is to provide a method for joining or uniting porcelain coated objects.

Yet another object of this invention is to provide an improved method for adhesively bonding porcelain coated objects.

How these and other objects of this invention are achieved will become apparent in the light of the accompanying disclosure. In at least one embodiment of the practice of this invention at least one of the foregoing objects will be achieved.

It has been found that porcelain coated objects, particularly porcelain coated iron or steel objects, can be joined or sealed together with improved results by adhesive sealing involving an extraneous bonding agent placed between the porcelain coated objects at the areas to be joined or united provided the porcelain coatings at said areas have a reduced thickness as compared with the thickness of the porcelain coatings at other areas of the porcelain coated objects. Specifically, porcelain coated objects are joined or sealed together with improved results if the porcelain coating at the location where the porcelain coated objects are to be sealed or jointed together, such as by adhesive sealing, has a thickness of about 1 mil or less, e.g., in the range from about 0.25 to about 1.5 mils. Satisfactory results are also obtainable if the thickness of the porcelain coating at the areas to be joined has a value as high as about 3 mils, more or less.

Adhesive are available which are extremely strong and which are being widely used in the metal working and fabricating industry. Adhesives or bonding agents have been prepared which have greater tensile strength than the porcelain coating on porcelain coated metal objects. This means, therefore, that porcelain coated metal objects can be adhesively joined and the resulting joint will be stronger than the porcelain coating itself.

This availability of superior and improved bonding agents for sealing or joining objects, such as porcelain coated objects, is advantageously utilized in the practice of this invention by utilizing the adhesive sealing or bonding agent in combination with a porcelan coating having improved strength. It has been observed that in a porcelain coated metal object the porcelain immediately adjacent the metal-porcelain interface is stronger than the porcelain in the body of the porcelain coating remote from the metal-porcelain interface. This has been explained in various ways but is generally agreed to be the result of the diffusion of metal ion or the growth of metal oxides "into" the glass from the base metal, thereby creating a metallic network in the glass at the interface.

This observation is employed in the practice of this invention by providing a porcelain coating on the porcelain objects to be joined or sealed which has almost minimal thickness, e.g., a thickness in the range 0.25–1.5 mils, or which has the desired improved strength properties. It appears that the portion of the porcelain coating on a porcelain coated iron or steel object immediately adjacent the metal-porcelain interface up to a distance of at least 1 mil from the interface has improved strength properties with respect to that portion of the porcelain coating more remote from the metal-porcelain interface. However, depending upon the firing procedure, particularly upon the duration of firing during the production of the porcelain coating, that portion of the porcelain coating influenced by the metallic network and having improved strength properties might increase to a thickness up to about 3 mils, more or less. Accordingly, in the porcelain coating of a porcelain coated iron or steel object that portion of the porcelain coating closer to the metal-porcelain interface up to a distance of about 3 mils usually exhibits greater strength characteristics than that portion of the porcelain coating more remote from the metal-porcelain interface, such as about 2–10 mils therefrom.

Although procelain coatings may satisfactorily be applied to cleaned, substantially untreated iron or steel surfaces, improved results are obtainable when the iron or steel surface to be coated is provided with a flash or extremely thin coating of a metal, such as nickel or cobalt. Such extremely thin, flash coatings having a thickness of merely about a few atoms, serve to improve the adherence of the porcelain coating to the metal substrate.

The practice of this invention is particularly applicable to metal objects which are coated with an admixture comprising ceramic frit and an organic resin as a binder therefor. When metal objects coated with such an admixture are fired the organic binder is destroyed and the ceramic frit fused to form the desired porcelain coating.

In accordance with a preferred embodiment of the practice of this invention, a metal object is coated with an admixture of ceramic frit and organic binder therefor and after the admixture has been cured so as to set the organic binder and stabilize the admixture coating on the object a portion of the admixture is removed by suitable means, such as scraping, buffing, undercutting, etc., at the location where the coated metal object is to be subsequently joined to another coated object, i.e., at the selected location the thickness of the admixture coating is reduced. Thereupon the resulting coated object is fired to remove and/or destroy the organic binder and to fuse the ceramic frit to form the desired porcelain coating. When the firing operation has been carried out the coated object will be provided with a relatively thin porcelain coating at that location from which a portion of the coating admixture had been removed. These selected areas of the resulting porcelain coated objects are then adhesively joined.

In my above-referred copending, coassigned patent application Ser. No. 564,760, filed July 13, 1966, of which this application is a continuation-in-part, and in copending, coassigned patent application Ser. No. 393,415, filed Aug. 31, 1964 in the name of Edward E. Mueller, now abandoned, there are described frit compositions, organic binder compositions and admixture compositions containing a ceramic frit and an organic binder therefor, as well as techniques for applying, curing, treating or altering and firing the resulting applied admixtures. The disclosures of these applications are herein incorporated and made part of this disclosure.

Various materials may be advantageously employed to effect the adhesive sealing or joining of the porcelain-coated objects in accordance with this invention. Many suitable adhesive bonding or sealing agents are known. Suitable such bonding agents include the well known thermosetting or thermoplastic organic resins, particularly the epoxy resins. Thermosetting silicone resins are also useful. Pressure sensitive, high molecular weight, high melting point, thermoplastic polymers are also particularly useful as sealing agents in accordance with this invention. A useful sealing agent, by way of example, is Scotch-Weld adhesive EC–2216–B/A, a two part modified epoxy system made by 3M Company. This adhesive can be cured at room temperature or, if desired, at a shorter time at an elevated temperature.

Illustrative of the practice of this invention, porcelain enameled steel panels were joined together by means of a high molecular weight, high melting point thermoplastic polymer-containing material. The resulting joined porcelain-enameled panels were twisted and pulled apart. It was observed that the bond between the panels broke in the porcelain layer rather than at the adhesive-porcelain interface or at the porcelain-metal interface. This test showed that the weak link in an adhesively joined porcelain coated metal object resides in the porcelain coating itself rather than in the bonding agent or in the adherence of the porcelain film to the metal substrate.

As will be apparent to those skilled in the art in the light of the foregoing disclosure, many modifications, alterations and substitutions are possible in the practice of this invention without departing from the spirit or scope thereof.

I claim:
1. A method of joining two porcelain coated objects which comprises applying to said objects as a coating an admixture comprising enamel frit and an organic resin as a binder therefor, curing the resulting coating to harden the same, at selected areas of the resulting coated objects reducing the thickness of the cured resin-frit coating, firing the coated objects to eliminate the organic resin binder and to fuse the enamel frit to form a porcelain coating on said objects, the resulting porcelain coating at the aforementioned selected areas having a thickness in the range from about 0.25 mil to about 1.5 mils and being comparatively less thick than the porcelain coatings on said other areas of said objects, applying a bonding agent at said selected areas, said bonding agent, when activated, having a tensile strength greater than the porcelain coating on said other areas and activating said bonding agent to join together the porcelain coated objects at said selected areas.

2. A method of joining porcelain coated bodies which comprises providing porcelain coated bodies such that the thicknesses of the porcelain coatings on said bodies at the selected areas where said bodies are to be joined are less than the thicknesses of the porcelain coatings on said objects at other areas, the thicknesses of the porcelain coatings at said selected areas being in the range from about 0.25 mil to about 1.5 mils, and joining or uniting said porcelain coated objects at said selected areas by means of a bonding agent, said bonding agent having a tensile strength greater than the porcelain coating at said other areas.

3. A method in accordance with claim 2 wherein said bonding agent is an epoxy resin.

References Cited

UNITED STATES PATENTS

| | | | |
|---|---|---|---|
| 2,771,969 | 11/1956 | Brownlow | 161—196X |
| 2,909,204 | 10/1959 | Somerville | 161—185X |
| 3,189,504 | 6/1965 | Whittle et al. | 156—89X |
| 3,297,186 | 1/1967 | Wells | 156—330X |
| 3,299,591 | 1/1967 | Woelk | 52—203 |
| 3,365,356 | 1/1968 | Shearouse | 156—89X |
| 3,370,977 | 2/1968 | Anderson et al. | 156—89UX |

JOHN T. GOOLKASIAN, Primary Examiner

J. C. GIL, Assistant Examiner

U.S. Cl. X.R.

65—61; 117—8, 40, 70, 129; 156—153; 161—184, 185